United States Patent
Coleman et al.

(10) Patent No.: US 6,183,336 B1
(45) Date of Patent: Feb. 6, 2001

(54) TORNADO POP

(76) Inventors: Thomas J. Coleman, 19170 Paddock Pl., Abingdon, VA (US) 24211; William K. Schlotter, IV, 117 Wateredge La., Fredericksburg, VA (US) 22406; Princess Ann Coleman, 19170 Paddock Pl., Abingdon, VA (US) 24211; Ann M. Schlotter, 117 Wateredge La., Fredericksburg, VA (US) 22406

( * ) Notice: Under 35 U.S.C. 154(b), the term of this patent shall be extended for 0 days.

(21) Appl. No.: 09/318,945

(22) Filed: May 26, 1999

(51) Int. Cl.[7] ............................ A63H 23/14; A63H 33/26
(52) U.S. Cl. ........................ 446/267; 446/71; 446/179; 446/153; 446/236; 446/266; 426/104
(58) Field of Search ...................... 446/266, 267, 446/236, 133, 134, 135, 201; 426/104

(56) References Cited

U.S. PATENT DOCUMENTS

| | | | |
|---|---|---|---|
| 4,490,931 | * 1/1985 | Fleemin | 40/406 |
| 4,831,757 | * 5/1989 | Sheeehan | 40/406 |
| 4,852,283 | * 8/1989 | Teng | 40/426 |
| 5,272,604 | * 12/1993 | Lin | 40/406 |
| 5,545,069 | * 8/1996 | Glynn | 446/73 |
| 5,676,988 | * 10/1997 | Coleman et al. | 426/134 |
| 5,677,018 | * 10/1997 | Shin | 428/18 |
| 5,743,782 | * 4/1998 | Glynn | 446/73 |
| 5,860,732 | * 1/1999 | Coleman et al. | 362/253 |
| 5,921,841 | * 7/1999 | Coleman et al. | 446/267 |

\* cited by examiner

Primary Examiner—Kevin T. Nguyen
Assistant Examiner—Kevin Hughes
(74) Attorney, Agent, or Firm—Melvin L. Crane Agent

(57) ABSTRACT

A candy holding device that is designed to combine candy and which supports the candy. The device includes an upper housing, a middle housing, and a lower housing. The upper housing is a liquid-filled container that has a metallic rotor in the lower portion. The rotor is put in motion by a motor and a magnetic rotor causing a tornado movement within the liquid to provide entertainment. The liquid may also containing objects (glitter, three-dimensional figures, etc.) that are visible to the user. Additionally, at the top of the upper housing is a support for a piece of candy which can be made to be replaceable is desired. The middle housing contains the motor and a switch means. The motor spins the magnetic rotor that in turn spins the metallic rotor in the upper housing. The switch means controls the motor and the lower housing contains the power source.

6 Claims, 1 Drawing Sheet

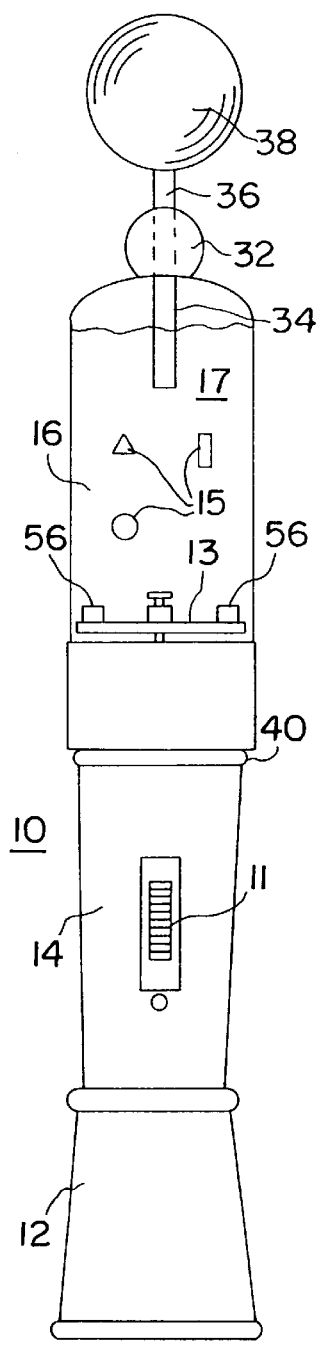
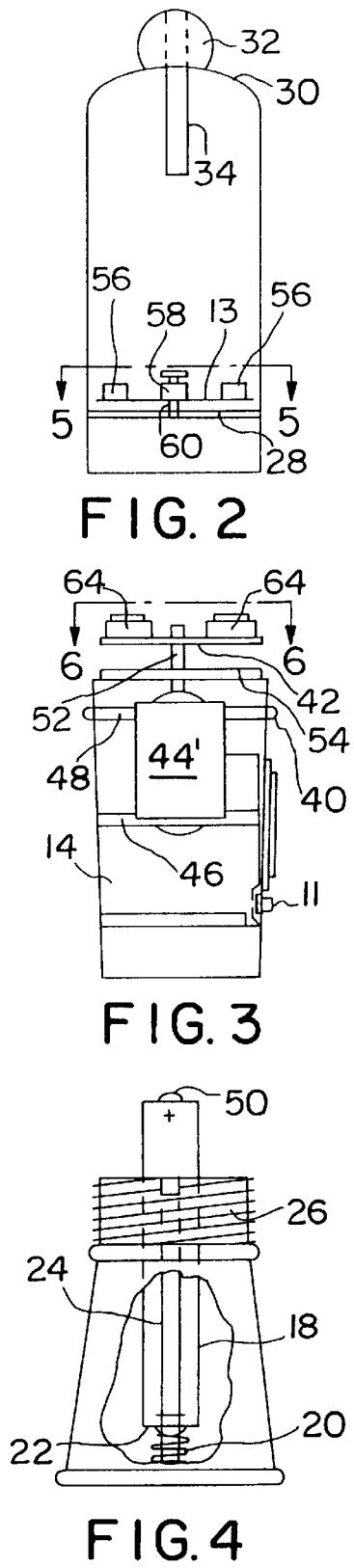
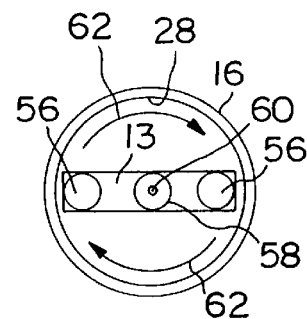
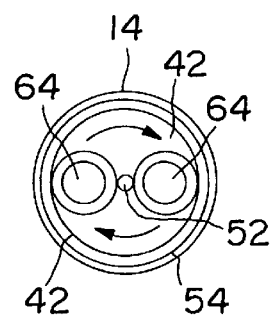

TORNADO POP

BACKGROUND OF THE INVENTION

This invention is directed to a tornado pop and more particularly to a candy holding device which also functions as an amusing toy.

Heretofore, U.S. patents have been issued for amusing toys. Such patents include U.S. Pat. Nos. 3,589,044; 4,993,986; 5,018,288; 5,272,604, and 5,673,813. These patents relate to a toy in which a motorized device causes an amusing event.

OBJECTS AND ADVANTAGES

It is therefore an object of the present invention to provide an amusing device which includes an edible candy pop in combination therewith.

Another object is to provide a toy device which functions to create a contained tornado within a container which is amusing to a person.

Still another object is to provide a toy having a tornado effect which can contain flying debris or objects with a contained toy.

Yet another object is to provide a toy-candy device which is not only amusing but provides a consumer a lollipop which can be consumed and then replaced by another lollipop for consumption.

Other objects, features and advantages of the invention will become obvious to those skilled in the art from a review of the specification and drawings.

BRIEF DESCRIPTION OF THE DRAWINGS

FIG. 1 illustrates a full-length side view;

FIG. 2 illustrates a side view of an upper housing;

FIG. 3 illustrates a middle housing part which includes a motor and a rotor;

FIG. 4 illustrates a lower housing part which has a cut-away section that exposes a battery power source;

FIG. 5 illustrates a bottom view of the rotor shown in a direction of arrow 5—5; and FIG. 6 illustrates a top view of a magnetic rotor as viewed in a direction of arrow 6—6.

DETAILED DESCRIPTION

Now referring to the drawings where like reference characters refer to like parts, there is shown in FIG. 1 a side view of the tornado pop 10. The device is made of plastic or any other suitable non-magnetic material in three separate housing sections 12, 14, 16. The middle housing section is shown with an electrical switch 11 and the upper housing section is shown with a metallic rotor 13 and the wavy lines near the upper end represent a liquid 17 within the upper housing. Shown in the liquid are objects or FIGS. 15 which can float around in the liquid. The bottom section includes a power source such as one or more batteries 18 as shown in the cut-away section in FIG. 4. A spring 20 is provided in the lower housing opposite the ground end 22 of the battery and forms a part of the electrical circuit. The lines 24 extending upwardly from the spring represents a ground connection of the electrical circuit. The bottom section of the housing is shown with screw threads 26 by which it is secured to the lower end of the middle section which likewise has threads.

FIG. 2 illustrates the upper section 16 of the housing. The upper section has a bottom closed end 28 and a closed rounded upper end 30. The upper end is provided with a candy stick holder 32 which has a projection 34 that extends into the upper end of the upper housing which closes the upper end and which supports a stick 36 of a lollipop 38. The lower end of the upper housing is provided with a diameter which fits over the upper end of the middle housing with a tight fit. The upper housing can be pushed onto the middle housing as far as a stop 40. The bottom end of the upper housing is positioned with sufficient room for the magnetic rotor 42 which is driven by a motor 44'. When the upper housing is in place, the magnetic rotor 42 will be adjacent to the metallic rotor 13 which is rotatable alone the bottom 28 of the upper housing. The motor 44' is supported within the middle housing by suitable supports 46 and 48. The motor is controlled by the switch which completes an electrical circuit to the motor between the ground 24 connected to one side of the motor and a positive connection 50 which is connected to a positive side of the switch as is well known by one skilled in the art. A shaft 52 that drives the magnetic rotor 42 is supported by a bearing (not shown) in a support 54 of the middle housing.

FIG. 5 is a bottom view of the upper housing section looking in a direction of the arrows 5—5. As seen, the metallic rotor includes two upwardly extending protrusions 56 near the ends and a central connection 58 by which the rotor is secured to a shaft 60. The arrows 62 indicate the rotation of the metallic rotor.

FIG. 6 is a view in a direction of arrows 6—6 of FIG. 3 which is a top view of the magnet rotor and end view of the housing section 14. The drawing shows the magnet rotor 42 with two permanent magnets 64.

In operation the upper housing is mostly filled with a suitable liquid 17 which can include glitter particles, three-dimensional figures or any other item that can be freely moved about in the liquid. The motor is activated by operation of the switch 11. The motor rotates the magnet rotor 42 which is closely adjacent to the rotor 44 with the metallic protrusions 56 therein. As the motor rotates the magnet rotor, the rotor with the metallic protrusions rotates in reaction to the magnetomotive force from the magnet. As the metallic rotor rotates, the liquid is caused to move to produce a tornado effect.

The switch can be a type which is fixed in the "on" or off position or one that makes an electrical contact only when held in the "on" position. That is, the switch is spring-loaded toward the off position.

It would be obvious to one skilled in the art that the housing parts should be made without any sharp corners or protrusions by which one could be injured.

Once the consumer has consumed the lollipop, the lollipop stick can be removed and replaced by another lollipop. The protrusion of the lollipop stick holder into the upper housing is solid so that no fluid will leak out when the lollipop stick is removed. Also, the lollipop stick holder can be removed in order to drain the fluid from the upper housing or to fill the upper housing with fluid. The glitter or objects 15 can be placed in the upper housing when assembled.

The foregoing relates to preferred exemplary embodiments of the invention, it being understood that other variants and embodiments thereof are possible within the spirit and scope of the invention, the latter being defined by the appended claims.

We claim:

1. A candy holding device,
said candy holding device includes a housing, a metallic rotor in said housing, a magnetic rotor juxtaposed and separated from said metallic rotor, a motor capable of driving said magnetic rotor which in turn uses magnetomotive force to turn said metallic rotor, an electrical power supply for directing an electrical current to said motor, and a switch control means for controlling the electrical current from said electrical power supply to said motor, a candy holder secured to said housing, and said candy holder supports a lollipop stick with a lollipop thereon.

2. A candy holding device as set forth in claim 1, in which said housing containing said metallic rotor includes therein a liquid.

3. A candy holding device as set forth in claim 2, in which said liquid includes therein separate, small, movable objects.

4. A candy holding device, said candy holding device includes a housing made of a non-magnetic material, said housing including a lower housing section (12), a middle housing section (14), and an upper housing section (16), a metallic rotor (13) in said housing section, a magnetic rotor in said middle housing section (14) positioned juxtaposed and separated from said metallic rotor (13) in said upper housing section, a motor in said middle housing section capable of driving said magnetic rotor which in turn uses magnetomotive force to rotate said metallic rotor, a power supply in said lower housing section for directing a current to said motor, a switch control means for controlling electrical current from said power supply to said motor, and a candy holder secured to an upper end of said upper housing section, wherein said candy holder supports a lollipop stick with a lollipop thereon.

5. A candy holding device as set forth in claim 4, in which said upper housing that contains said metallic rotor incudes therein a liquid.

6. A candy holding device as set forth in claim 5, in which in said upper housing said liquid includes therein separate, small, movable objects.

* * * * *